US011456619B2

(12) United States Patent
Kawamura et al.

(10) Patent No.: US 11,456,619 B2
(45) Date of Patent: Sep. 27, 2022

(54) ENERGY OPERATION SUPPORT SYSTEM AND METHOD THEREOF

(71) Applicant: Hitachi, Ltd., Tokyo (JP)

(72) Inventors: Tsutomu Kawamura, Tokyo (JP); Masatoshi Kumagai, Tokyo (JP); Hirotaka Takahashi, Tokyo (JP); Ryousuke Nakamura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/980,491

(22) PCT Filed: Mar. 11, 2019

(86) PCT No.: PCT/JP2019/009828
§ 371 (c)(1),
(2) Date: Sep. 14, 2020

(87) PCT Pub. No.: WO2019/207984
PCT Pub. Date: Oct. 31, 2019

(65) Prior Publication Data
US 2021/0028647 A1    Jan. 28, 2021

(30) Foreign Application Priority Data

Apr. 27, 2018 (JP) .............................. JP2018-087674

(51) Int. Cl.
*H02J 13/00* (2006.01)
*G05F 1/66* (2006.01)
*G06Q 50/06* (2012.01)

(52) U.S. Cl.
CPC .......... *H02J 13/00004* (2020.01); *G05F 1/66* (2013.01); *G06Q 50/06* (2013.01)

(58) Field of Classification Search
CPC ................ H02J 13/00004; H02J 3/003; H02J 2310/48; H02J 13/00001; H02J 3/322;
(Continued)

(56) References Cited

U.S. PATENT DOCUMENTS

2004/0225649 A1* 11/2004 Yeo ........................ G01D 4/004
2010/0217550 A1*  8/2010 Crabtree ........... H02J 13/00016
702/62
(Continued)

FOREIGN PATENT DOCUMENTS

JP    2015-184832 A    10/2015
JP    2016-25829 A      2/2016
(Continued)

OTHER PUBLICATIONS

Abreu et al., "Using pattern recognition to identify habitual behavior in residential electricity consumption", Dec. 20, 2011, Energy and Buildings 49 (2012) 479-487. (Year: 2011).*
(Continued)

*Primary Examiner* — Mohammad Ali
*Assistant Examiner* — Kelvin Booker
(74) *Attorney, Agent, or Firm* — Crowell & Moring LLP

(57) ABSTRACT

Included are an energy management apparatus that manages at least one or more management target that consumes energy; and a user terminal that transmits and receives information to and from the energy management apparatus via a network. The energy management apparatus includes an energy management controller that prepares a question regarding a behavior of a user who uses the at least one or more management target, and transmits it to the user terminal. The user terminal includes a user terminal controller that transmits a question answer regarding the received question to the energy management controller when receiving the question transmitted from the energy management controller. The energy management controller predicts an energy consumption amount of the at least one or more management target based on the received question answer when receiving the question answer transmitted from the user terminal controller.

9 Claims, 22 Drawing Sheets

(58) Field of Classification Search
CPC ............ H02J 3/144; G06F 1/66; G06Q 50/06; Y02B 70/3225; Y04S 20/222; Y02T 90/168

See application file for complete search history.

(56) References Cited

U.S. PATENT DOCUMENTS

| | | | |
|---|---|---|---|
| 2011/0040666 A1* | 2/2011 | Crabtree | G06Q 50/06 702/179 |
| 2012/0116600 A1* | 5/2012 | Schmid | H02J 3/14 713/300 |
| 2014/0229026 A1* | 8/2014 | Cabrini | G06Q 50/06 700/291 |
| 2014/0250399 A1* | 9/2014 | Gaherwar | G06Q 10/06 715/771 |
| 2014/0277761 A1* | 9/2014 | Matsuoka | F24F 11/30 700/276 |
| 2015/0094968 A1* | 4/2015 | Jia | G05B 15/02 702/60 |
| 2016/0132773 A1* | 5/2016 | Chandrasekaran | G06N 5/04 706/11 |
| 2017/0018923 A1* | 1/2017 | Rombouts | G06Q 50/06 |
| 2017/0167742 A1* | 6/2017 | Radovanovic | F24F 11/70 |
| 2017/0207633 A1 | 7/2017 | Nakayama et al. | |
| 2017/0234562 A1* | 8/2017 | Ribbich | G05D 23/1934 700/277 |
| 2019/0086882 A1* | 3/2019 | Okita | G05B 15/02 |
| 2019/0089194 A1* | 3/2019 | Okita | H02J 13/00004 |

FOREIGN PATENT DOCUMENTS

| | | |
|---|---|---|
| JP | 2016-131420 A | 7/2016 |
| JP | 2017-130183 A | 7/2017 |
| JP | 2017-147912 A | 8/2017 |
| WO | WO 2014/002199 A1 | 1/2014 |

OTHER PUBLICATIONS

Albert et al., "Smart Meter Driven Segmentation: What Your Consumption Says About You", Sep. 23, 2012, IEEE Transactions on Power Systems, vol. 28, No. 4, Nov. 2013. (Year: 2012).*

Rhodes et al., "Clustering analysis of residential electricity demand profiles", Mar. 21, 2014, Applied Energy 135 (2014) 461-471. (Year: 2014).*

Ramos et al., "A data-mining-based methodology to support MV electricity customers' characterization", Sep. 17, 2014, Energy and Buildings 91 (2015 ) 16-25. (Year: 2014).*

Korkas et al., "Occupancy-based demand response and thermal comfort optimization in microgrids with renewable energy sources and energy storage", Jun. 2015, Applied Energy 163 (2016) 93-104. (Year: 2015).*

Krishnamurti et al., "Preparing for smart grid technologies: A behavioral decision research approach to understanding consumer expectations about smart meters", Apr. 2011, Energy Policy 41 (201 2) 790-797. (Year: 2011).*

Palensky et al., "Demand Side Management: Demand Response, Intelligent Energy Systems, and Smart Loads", Aug. 2011, IEEE Transactions on Industrial Informatics, vol. 7, No. 3. (Year: 2011).*

Nakamura et al., "Operation Plan Optimization Method for Heat Interchange in Energy Network", 2016, SICE Journal of Control, Measurement, and System Integration, 9:3, 128-133, DOI: 10.9746/jcmsi.9.128. (Year: 2016).*

International Search Report (PCT/ISA/210) issued in PCT Application No. PCT/JP2019/009828 dated May 21, 2019 with English translation (four (4) pages).

Japanese-language Written Opinion (PCT/ISA/237) issued in PCT Application No. PCT/JP2019/009828 dated May 21, 2019 (six (6) pages).

Japanese-language Office Action issued in Japanese Application No. 2018-087674 dated Apr. 26, 2022 with English translation (15 pages).

* cited by examiner

ENERGY OPERATION SUPPORT SYSTEM AND METHOD THEREOF

TECHNICAL FIELD

The present invention relates to an energy operation support system and a method thereof for a consumer such as a building or factory including an electric vehicle (EV) charging station, a storage battery, an air conditioning facility, a lighting facility, a private power generation facility, and the like.

BACKGROUND ART

In the electric power system, in order to balance the demand and supply of electric power, conventionally, a spare generator has been prepared according to the demand amount to secure the supply amount. However, in recent years, in Europe and the United States, demand response (DR), which intelligently controls the demand amount of electric power of consumers such as buildings and factories, has been spread. In addition, in Japan, as part of the electric power system reform, the Negawatt transaction market was founded in 2017, and it is expected that the needs for demand response will increase. For consumers, in addition to the hitherto effort for energy saving, the demand response makes it possible to further reduce energy costs.

When a consumer responds to a demand response command from an aggregator, it is necessary to estimate the demand response amount that can be responded in advance. In response to such a request, in PTL 1, the consumer evaluates the demand response (DR) amount based on the power generation prediction, the demand prediction, and the apparatus state.

CITATION LIST

Patent Literature

PTL 1: JP 2017-130183 A

SUMMARY OF INVENTION

Technical Problem

However, since the DR amount largely depends on the behavior of the user in the consumer and has uncertainty, there has been a problem that evaluating the DR amount to a less extent does not maximally utilize the demand response. For example, in the demand response utilizing the air conditioning facility in the building, even if the air conditioning output is set in advance, the user may change the set temperature when the comfort at room temperature is impaired. In addition, in the demand response that utilizes storage batteries of electric vehicles (EV), which are expected to spread rapidly in the future, it is considered that the DR amount is greatly influenced by the behavior of EV users.

An object of the present invention is to highly accurately predict the energy consumption amount of a management target based on information in which the behavior of the user is reflected.

Solution to Problem

In order to solve the above problems, the present invention includes: an energy management apparatus configured to manage at least one or more management target configured to consume energy; and a user terminal configured to transmit and receive information to and from the energy management apparatus via a network. The energy management apparatus includes an energy management controller configured to prepare a question regarding a behavior of a user who uses the at least one or more management target, the energy management controller configured to transmit the question prepared to the user terminal. The user terminal includes a user terminal controller configured to transmit a question answer regarding the question received to the energy management controller when receiving the question transmitted from the energy management controller. The energy management controller predicts an energy consumption amount of the at least one or more management target based on the question answer received when receiving the question answer transmitted from the user terminal controller.

Advantageous Effects of Invention

According to the present invention, it is possible to highly accurately predict the energy consumption amount of a management target based on information in which the behavior of the user is reflected.

DESCRIPTION OF EMBODIMENTS

Hereinafter, embodiments of the present invention will be described with reference to the drawings.

First Embodiment

In the present embodiment, the correlation between pre-registration information from the user terminal and conventional result information on DR is analyzed, a question that induces DR behavior of the user is prepared from the analysis result, the prepared question is transmitted to the user terminal, the DR implementation probability of the user is evaluated based on the conventional result information and the question answer from the user terminal, and the DR operation plan is planned from the evaluation results.

Figure 1:
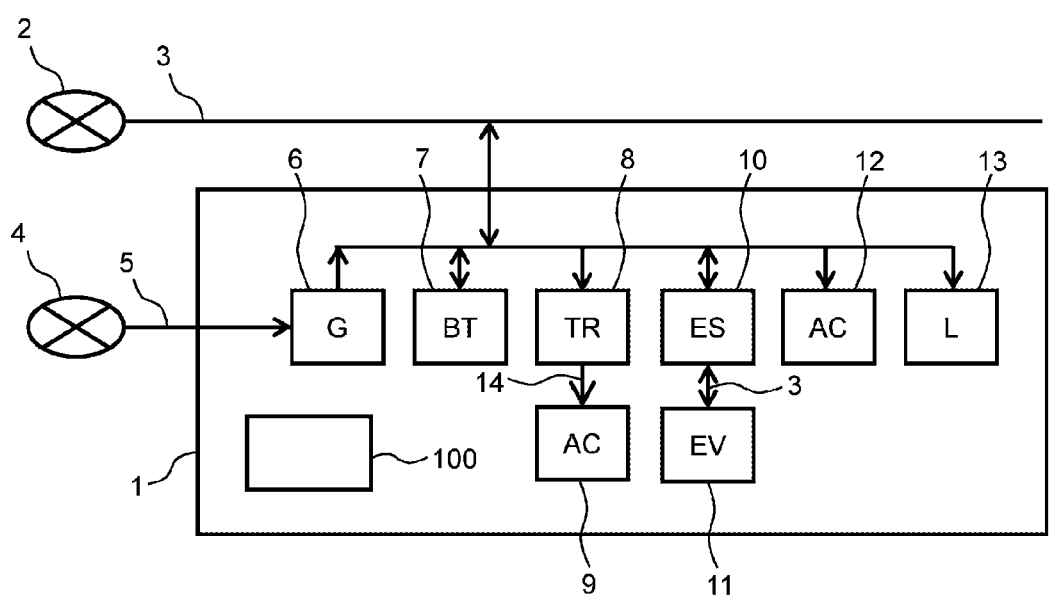
FIG. 1 is a configuration diagram showing an example of the configuration of an energy system of a consumer according to an embodiment of the present invention.

FIG. 1 shows an example of the configuration of an energy system regarding the DR of a consumer according to an embodiment of the present invention. The energy system 1 of the consumer is a facility installed in a factory, a building, or the like. The energy system 1 is supplied with electric power 3 from the electric power system 2 and city gas 5 from the gas system 4. The energy system 1 includes a generator (G) 6, a storage battery (BT) 7, turbo refrigerator 8, an air conditioning facility (AC) 9, an electric vehicle (EV) charging station (ES) 10, an air conditioning facility (AC) 12, another load 13, and an energy management apparatus 100. An electric vehicle (EV) 11 is arranged in an electric vehicle (EV) charging station (ES) 10. The energy management apparatus 100 is connected to various facilities via a network (not shown) in order to transmit and receive information to and from various facilities belonging to the energy system 1.

In the energy system 1, the generator 6 supplies electric power 3 to various facilities using city gas 5 as fuel. The storage battery 7 stores and discharges electric power 3. The turbo refrigerator 8 supplies cold water (for example, water at 5° C.) 14 to the air conditioning facility 9 using the electric power 3. The electric vehicle (EV) charging station 10 stores and discharges the electric power 3 of the electric vehicle (EV) 11. The air conditioning facility 12 performs air conditioning using the electric power 3. The other load 13 includes, for example, a lighting facility, an elevator, and an escalator, and consumes the electric power 3. The consumer which manages the energy system 1 performs a demand response utilizing several facilities of the energy system 1.

Figure 2:
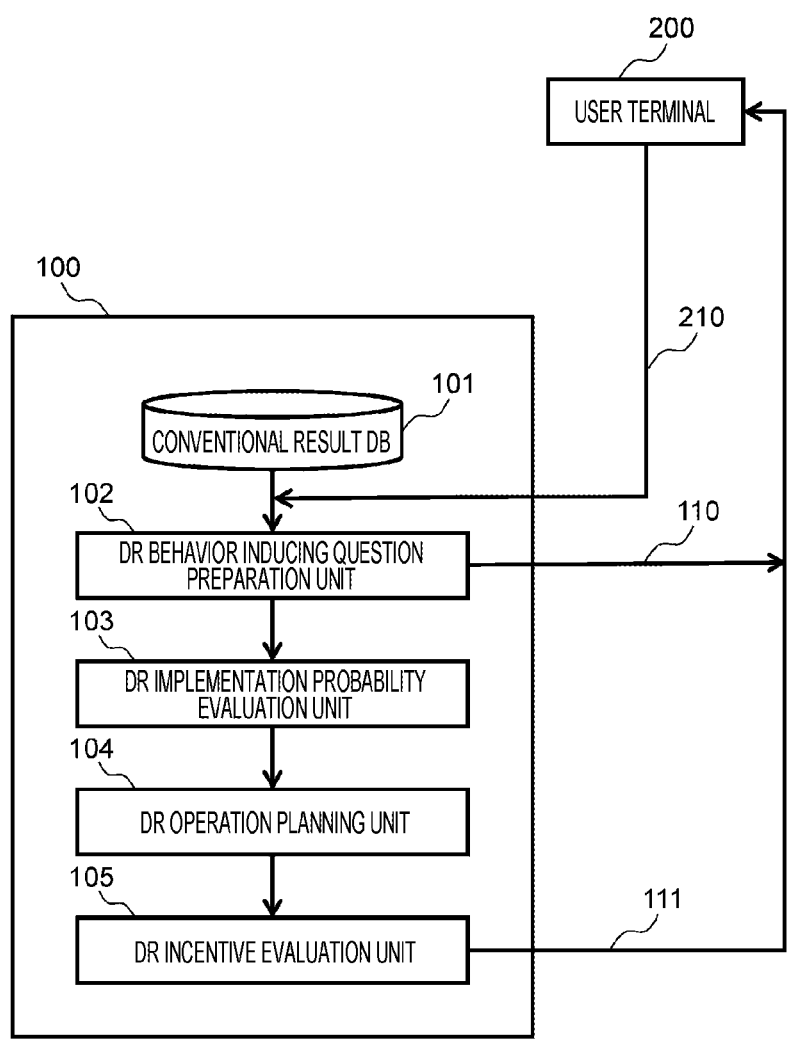
FIG. 2 is a configuration diagram showing an example of a demand response operation support function according to the embodiment of the present invention.

FIG. 2 shows an example of functions of a demand response operation support system utilizing an electric vehicle (EV). The demand response operation support system includes, as an energy operation support system, for example, an energy management apparatus 100, and a user terminal 200 mounted on an electric vehicle (EV) 11; and the energy management apparatus 100 and the user terminal 200 are connected to each other via a network (not shown). The energy management apparatus 100 includes, for example, a computer device including a central processing unit (CPU), an input device, an output device, a communication device, and a storage device. The CPU of the energy management apparatus 100 collectively controls the entire energy management apparatus 100, and functions as an energy management controller that manages each facility for consuming energy (electric power) as a management target. The user terminal 200 is a computer device including a CPU, an input device, an output device, a communication device, and a storage device, and includes, for example, a car navigation system or a smartphone (mobile terminal). The CPU of the user terminal 200 functions as a user terminal controller that integrally controls the entire user terminal 200.

As a demand response in response to a request from the aggregator (reduction amount or increase amount of power), the energy management controller transmits/receives information to/from the user terminal controller when managing so that the electric energy of the entire energy management apparatus 100 or the electric energy of each facility meets a specified value (reduction amount or increase amount of power). For example, the energy management controller prepares a question regarding the behavior of the user who uses the management target (electric vehicle (EV) charging station 10), and transmits the prepared question to the user terminal 200. When receiving the question transmitted from the energy management controller, the user terminal controller of the user terminal 200 transmits a question answer (information in which the user's behavior is reflected) regarding the received question to the energy management controller. When receiving the question answer transmitted from the user terminal controller, the energy management controller predicts the energy consumption amount of the management target based on the received question answer. Since predicting the energy consumption amount of the management target based on the question answer (information in which the user's behavior is reflected), the energy management controller can predict the energy consumption amount of the management target with high accuracy.

In addition, when receiving a request to send information regarding a demand response from the energy management controller, the user terminal controller transmits pre-registration information according to the request to send to the energy management controller. When receiving the pre-registration information from the user terminal controller, the energy management controller prepares a question that induces the user's demand response behavior based on the received pre-registration information and the conventional result information regarding the demand response, and transmits the prepared question to the user terminal. When further receiving a question transmitted from the energy management controller (a question that induces the user's demand response behavior), the user terminal controller transmits a question answer regarding the received question to the energy management controller. When further receiving the question answer transmitted from the user terminal controller, the energy management controller predicts the demand response implementation probability of the user and the demand response amount of the management target based on the received question answer. Since predicting the demand response implementation probability of the user and the demand response amount of the management target based on the question answer (information in which the user's behavior is reflected), the energy management controller can accurately grasp the demand response implementation probability of the user and the demand response amount of the management target, and as a result, the energy management controller can accurately grasp the reduction amount or increase amount of power as the demand response amount (DR amount).

Specifically, the energy management apparatus 100 includes a conventional result database (DB) 101, a DR behavior inducing question preparation unit 102, a DR implementation probability evaluation unit 103, a DR operation planning unit 104, and a DR incentive evaluation unit 105. The DR behavior inducing question preparation unit 102, the DR implementation probability evaluation unit 103, the DR operation planning unit 104, and the DR incentive evaluation unit 105 are stored in the storage device as various processing programs, and the CPU executes various programs as an energy management controller, whereby the function of each unit is achieved.

The conventional result database 101 stores information indicating the conventional (past) result such as date and time, weather information (temperature, humidity), power demand of the entire energy system 1 (for example, power demand every 30 minutes), the number of building and factory users, DR amount (reduction amount or increase amount of power every 30 minutes with respect to aggregator request), and information on building business categories (building type, such as office, factory, and department store).

The DR behavior inducing question preparation unit 102 prepares a question that induces the DR behavior of the user based on information stored in the conventional result database 101 (conventional result information) and user information 210 from the user terminal 200 such as pre-registration information, and transmits information regarding the prepared question 110 to the user terminal 200. The DR implementation probability evaluation unit 103 evaluates the DR implementation probability of the user based on information stored in the conventional result database 101 (conventional result information) and user information 210 from the user terminal 200 such as a question answer, and outputs the evaluation result to the DR operation planning unit 104. The DR operation planning unit 104 makes a DR operation plan based on the evaluation result of the DR implementation probability of the DR implementation probability evaluation unit 103. The DR incentive evaluation unit 105 evaluates the user's DR incentive based on the DR operation plan, and transmits a notification regarding the point 111 to the user terminal 200 as the evaluation result.

Figure 3:
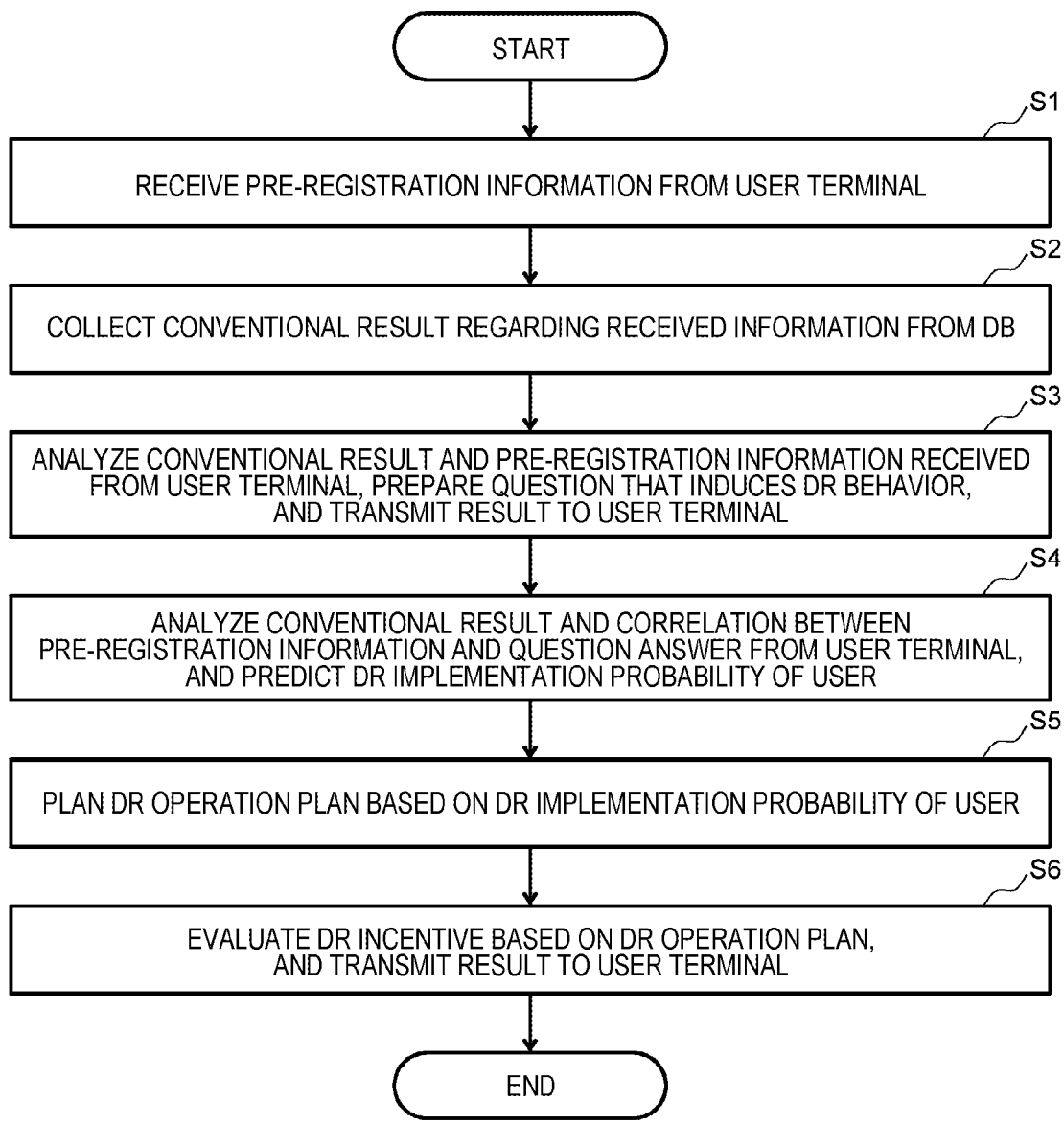
FIG. 3 is a flowchart showing an example of a processing flow of a demand response operation support function according to the embodiment of the present invention.

FIG. 3 shows an example of the processing flow of the energy management apparatus 100. In the energy management apparatus 100, the DR behavior inducing question preparation unit 102 receives the pre-registration information as the user information 210 from the user terminal 200 (S1), and collects conventional result information indicating the conventional result regarding the received information (pre-registration information) from the DB (conventional result DB 101) (S2). Next, the DR behavior inducing question preparation unit 102 analyzes the conventional result (collected conventional result information) and the pre-registration information received from the user terminal 200, prepares a question that induces DR behavior of the user from the analysis result, and transmits information regarding the prepared question 110 to the user terminal 200 (S3). On this occasion, the DR behavior inducing question preparation unit 102 can change the content of the question (see the EV parking lot reservation screen 220 in FIG. 7 and the EV parking lot reservation screen 220 in FIG. 11) according to the business category of the consumer (building type, such as office, factory, and department store). This makes it possible to obtain an appropriate question answer from the user (user terminal 200) according to the business category of the consumer.

Next, when receiving, for example, a question answer from the user terminal 200 as the user information 210, the DR implementation probability evaluation unit 103 analyzes the conventional result (information) and the correlation between the pre-registration information and the question answer from the user terminal 200, and predicts (evaluates) the DR implementation probability of the user from the analysis result (S4). Next, the DR operation planning unit 104 plans a DR operation plan (operation plan for operating the power of the entire energy system 1), for example, the reduction amount or increase amount of power of the entire energy system 1 (the entire management target of the energy management apparatus 100) based on the prediction (evaluation) result of the DR implementation probability of the user by the DR implementation probability evaluation unit 103 (S5). Next, the DR incentive evaluation unit 105 evaluates the user's DR incentive based on the DR operation plan, transmits, as an evaluation result (information regarding the DR incentive), a notification 112 regarding the incentive such as points to the user terminal 200 (S6), and ends the processing in this routine. It should be noted that regarding this notification 112, the information regarding the DR incentive of the user is transmitted to the user terminal 200 as prior information before the user uses the management target (for example, the electric vehicle (EV) charging station 10). Thus, the DR participation by the user can be induced. In addition, in step S4, the DR implementation probability evaluation unit 103 can predict (evaluate) the DR amount (reduction amount or increase amount of power) of the management target (electric vehicle (EV) charging station 10) from the analysis result. This facilitates the planning of the reduction amount or the increase amount of the power of the entire energy system 1 as the DR operation plan.

FIGS. 4 to 10 show examples of EV parking lot reservation screens for commercial buildings.

Figure 4:
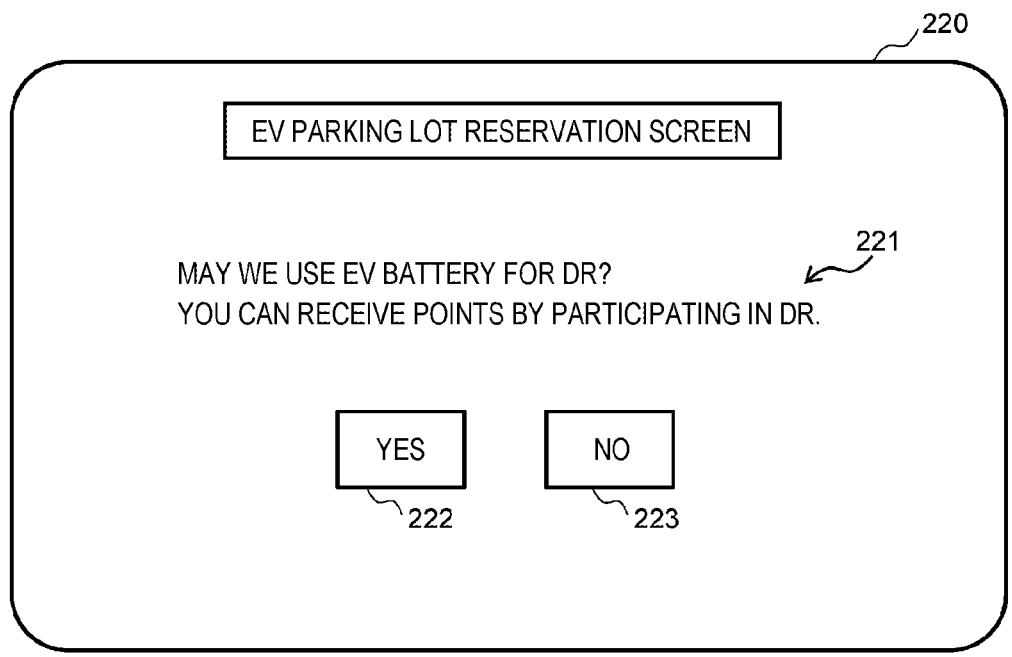
FIG. 4 is a configuration diagram showing an example of an EV parking lot reservation screen in a commercial building according to the embodiment of the present invention.

FIG. 4 shows an example of an EV parking lot reservation screen for inquiring of a user (EV user) who uses an electric vehicle (EV) 11 whether or not to participate in DR utilizing an EV storage battery. The EV parking lot reservation screen 220 is, for example, a display screen of a car navigation system or a smartphone. On the EV parking lot reservation screen 220, as display information 221 generated based on the information transmitted from the energy management apparatus 100, for example, "May we use the EV storage battery for DR? You can receive points by participating in DR." is displayed. As the selection buttons, a selection button 222 indicating "Yes" and a selection button 223 indicating "No" are displayed. On this occasion, the display information 221 indicates that the user can receive points as an incentive when participating in DR, and prompts the user to participate in DR. When the user operates the selection button 222 to participate in DR, the process proceeds to the next screen. In addition, when the user operates any one of the selection buttons, the operation content of the selection button is transmitted from the user terminal 200 to the energy management apparatus 100 as pre-registration information or a question answer.

Figure 5:
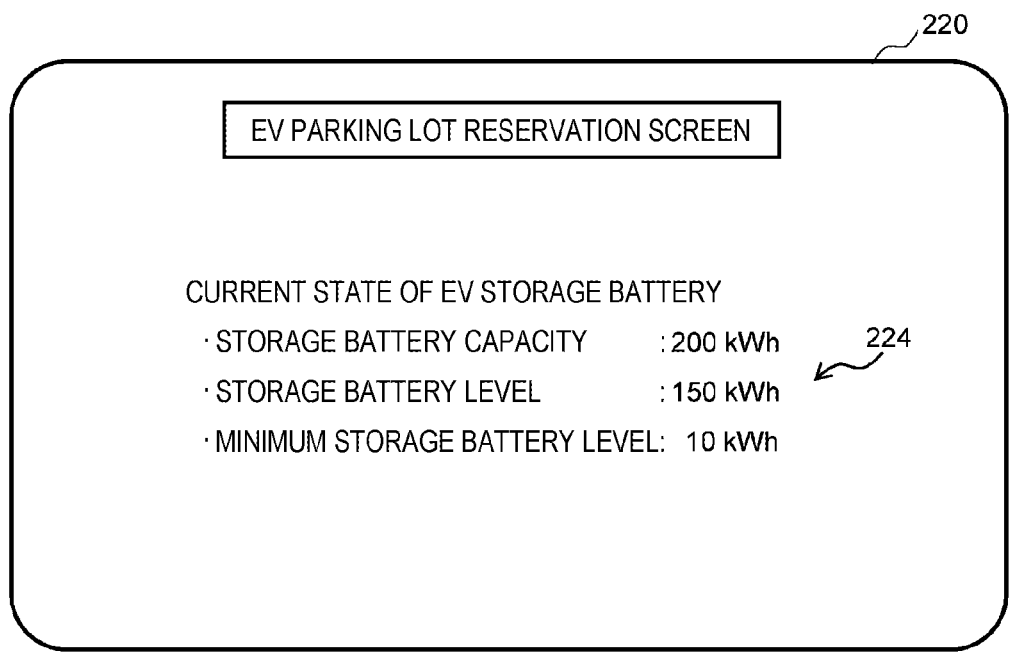
FIG. 5 is a configuration diagram showing an example of an EV parking lot reservation screen in a commercial building according to the embodiment of the present invention.

FIG. 5 shows an example of an EV parking lot reservation screen for checking the current state of the storage battery of the EV when participating in DR. In the EV parking lot reservation screen 220, as the display information 224 generated based on the information obtained from the controller that controls the electric vehicle (EV) 11 of the user, as the "current state of EV storage battery", "storage battery capacity: 200 kWh", "storage battery level: 150 kWh", and "minimum storage battery level: 10 kWh" are displayed. The content of the display information 224 is transmitted from the user terminal 200 to the energy management apparatus 100 as pre-registration information.

Figure 6:
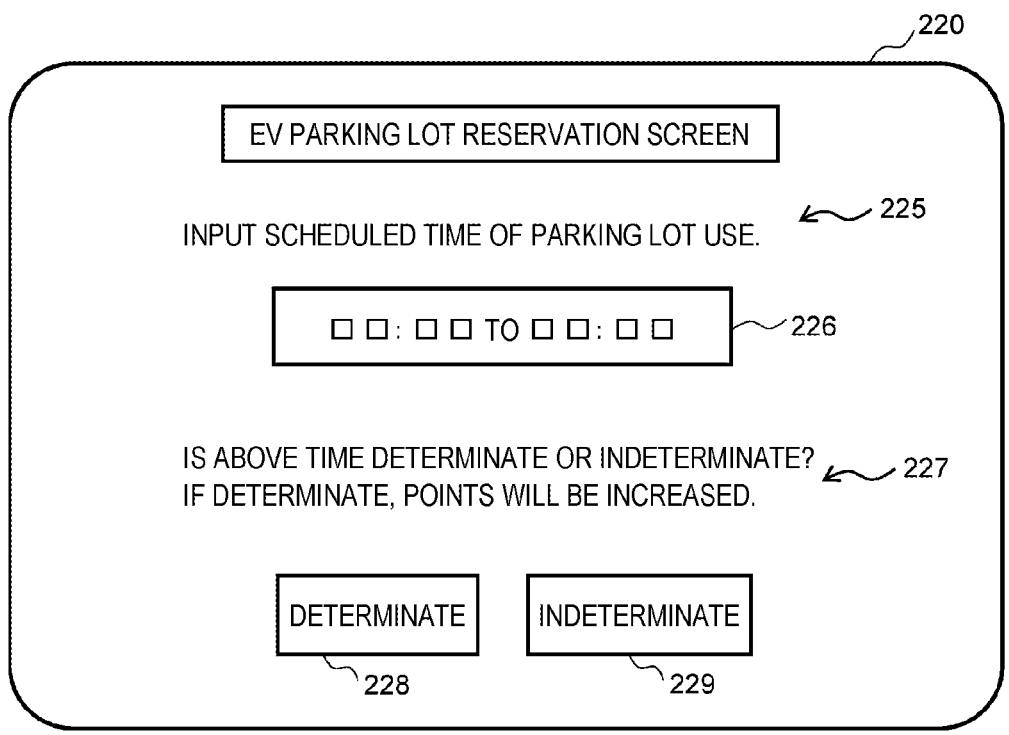
FIG. 6 is a configuration diagram showing an example of an EV parking lot reservation screen in a commercial building according to the embodiment of the present invention.

FIG. 6 shows an example of the EV parking lot reservation screen for the user to input the scheduled time of use when using the parking lot of the building. On the EV parking lot reservation screen 220, "Input scheduled time of the parking lot use." is displayed as the display information 225 generated based on the information transmitted from the energy management apparatus 100, and an input region 226 for inputting the scheduled time is displayed below that. In addition, below the input region 226, as display information 227, "Is the above time determinate or indeterminate? In the case of determinateness, the points will be increased." is displayed, and as selection buttons, a selection button 228 indicating "determinateness" and a selection button 229 indicating "indeterminateness" are displayed. Here, the display information 227 indicates that the points are increased when the scheduled time is determinate. When the user operates the selection button 228 or the selection button 229, the information on the input region 226 and the operation content of the selection button are transmitted from the user terminal 200 to the energy management apparatus 100 as pre-registration information or a question answer.

Figure 7:
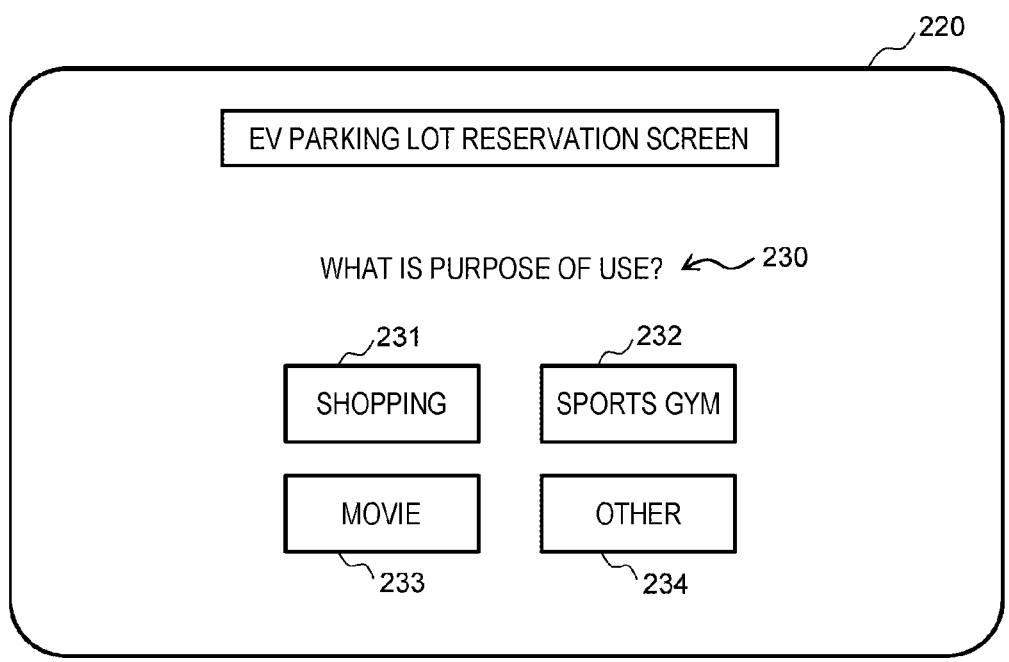
FIG. 7 is a configuration diagram showing an example of an EV parking lot reservation screen in a commercial building according to the embodiment of the present invention.

FIG. 7 shows an example of an EV parking lot reservation screen for inputting information for evaluating the implementation probability of DR as compared with the conventional result from the purpose of use of the building. On the EV parking lot reservation screen 220, "What is the purpose of use?" is displayed as the display information 230 generated based on the information transmitted from the energy management apparatus 100, and below that, as the selection buttons for asking the purpose of use of the building, a selection button 231 indicating "shopping", a selection button 232 indicating "sports gym", a selection button 233 indicating "movie", and a selection button 234 indicating "other" are displayed. When the user operates any one of the selection buttons, the operation content of the selection button (information corresponding to the question item and information indicating the purpose of use of the building) is transmitted from the user terminal 200 to the energy management apparatus 100 as a question answer.

Figure 8:
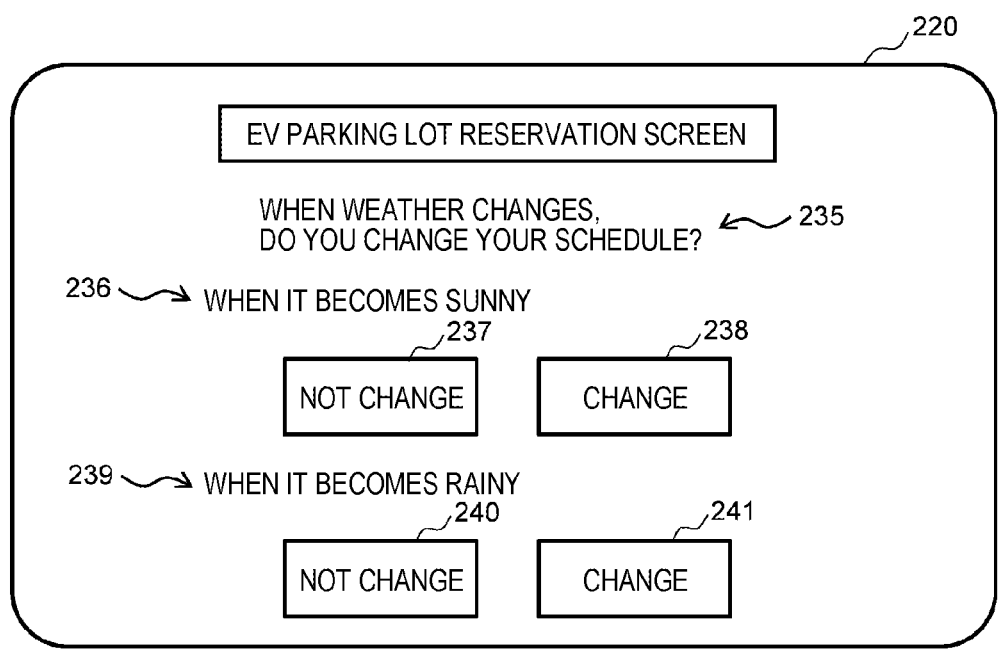
FIG. 8 is a configuration diagram showing an example of an EV parking lot reservation screen in a commercial building according to the embodiment of the present invention.

FIG. 8 shows an example of an EV parking lot reservation screen for asking whether to change the schedule when the weather changes. On the EV parking lot reservation screen 220, as the display information 235 generated based on the information transmitted from the energy management apparatus 100, "When the weather changes, do you change your schedule?" is displayed, below that, as the display information 236, "when it becomes sunny" is displayed, and below that, as selection buttons, a selection button 237 indicating "not change" and a selection button 238 indicating "change" are displayed. Furthermore, below the selection buttons 237 and 238, as the display information 239, "when it becomes rainy" is displayed, and below that, as selection buttons, a selection button 240 indicating "not change" and a selection button 241 indicating "change" are displayed. A user coming to the shopping because of the rainy weather may change the behavior when the weather changes to fine weather, so that the user is asked whether to change the schedule. When the user operates any one of the selection buttons, the operation content of the selection button is transmitted from the user terminal 200 to the energy management apparatus 100 as a question answer.

Figure 9:
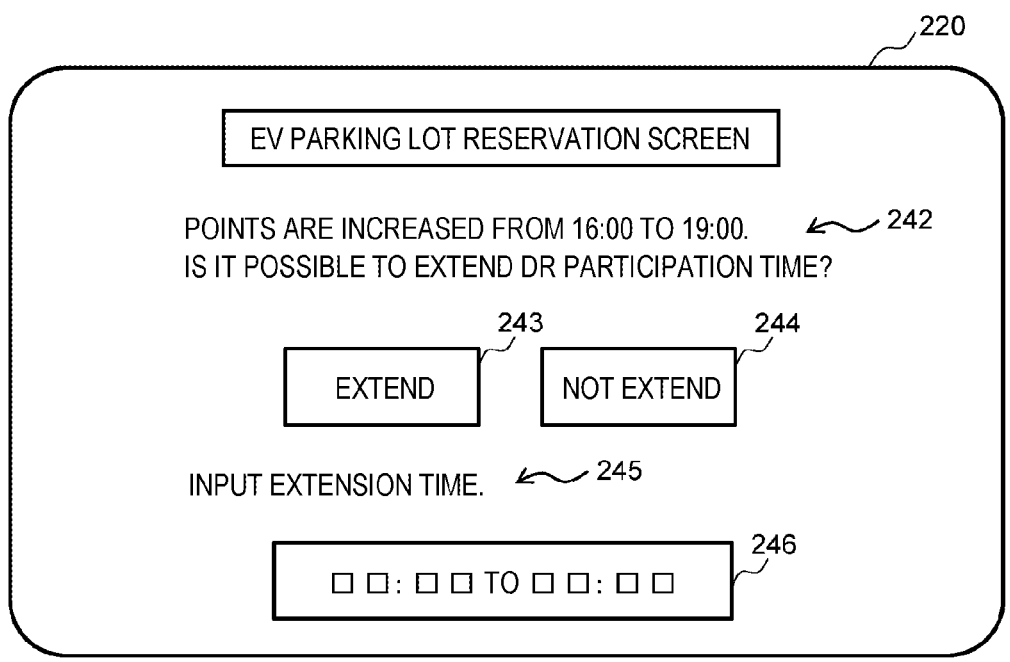
FIG. 9 is a configuration diagram showing an example of an EV parking lot reservation screen in a commercial building according to the embodiment of the present invention.

FIG. 9 shows an example of the EV parking lot reservation screen for prompting participation in DR at a specific time period. On the EV parking lot reservation screen 220, as the display information 242 generated based on the information transmitted from the energy management apparatus 100, "Points are increased from 16:00 to 19:00. Is it possible to extend DR participation time?" is displayed, and below that, as selection buttons, a selection button 243 indicating "extend" and a selection button 244 indicating "not extend" are displayed. Below the selection buttons 243 and 244, "Input extension time." is displayed as the display information 245, and below that, an input region 246 for inputting an extension time is displayed.

In order to increase the number of DR participants during the time period when the needs of DR increase, the user is asked a question that urges the user to participate in DR by increasing the points. In addition, when the user accepts to participate in DR, the user is asked to input an extendable time (time period). When the user operates any one of the selection buttons, the operation content of the selection button is transmitted from the user terminal 200 to the energy management apparatus 100 as a question answer. On this occasion, when the user operates the selection button 243 and inputs the extension time in the input region 246, the information on the extension time is also transmitted as the information on the question answer.

Figure 10:
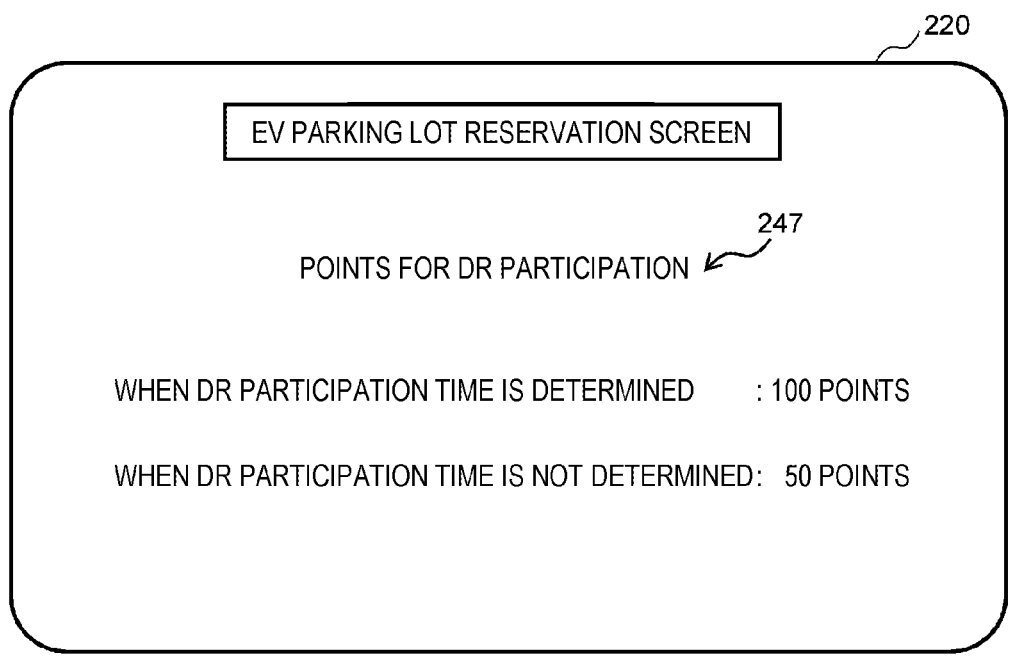
FIG. 10 is a configuration diagram showing an example of an EV parking lot reservation screen in a commercial building according to the embodiment of the present invention.

FIG. 10 shows an example of the EV parking lot reservation screen for displaying the content of the notification when the DR operation plan of the DR is planned. On the EV parking lot reservation screen 220, as the information generated based on the information transmitted from the energy management apparatus 100, and the display information 247 for presenting the points as a DR incentive to the user, "points for DR participation", "when DR participation time is determined: 100 points", and "when DR participation time is not determined: 50 points" are displayed.

Figure 15:
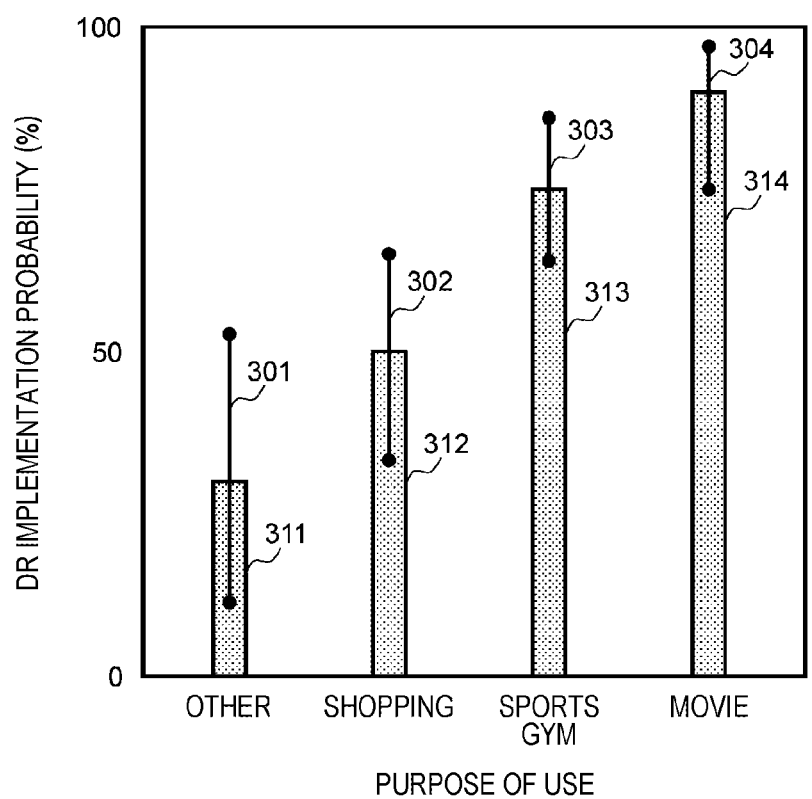
FIG. 15 is a configuration diagram showing an example of an analysis result of a demand response implementation probability based on a question answer of a user according to the embodiment of the present invention.

In the DR operation plan, a DR operation plan is planned using the conventional result information, the user's pre-registration information, and the DR implementation probability evaluated based on the question answer. On this occasion, the DR implementation probability of the user is clustered by question item specified by the question answer information. For example, as shown in FIG. 15, the DR implementation probabilities of users are clustered by purpose of use of the building (by purpose of use of the user), and the expected value and standard deviation are evaluated by purpose of use of the building. For example, by purpose of use of the building (by purpose of use of the user), the DR implementation probabilities of the user are evaluated as the other standard deviation 301, shopping standard deviation 302, sports gym standard deviation 303, and movie standard deviation 304, and are evaluated as the other expected value 311, shopping expected value 312, sports gym expected value 313, and movie expected value 314. It should be noted that in addition to the purpose of use of the building (purpose of use of the user), the age, sex, occupation, or the like of the user can be used as the question item specified by the question answer information.

In the DR operation plan, when the expected value and the standard deviation of the DR implementation probability are used, the expected value and the standard deviation of the incentive (point) for each user can be evaluated from the profit from DR. Here, using, for example, the conventional result information, the user's pre-registration information, and the user's question answer, the evaluation of the DR implementation probability performs a cluster analysis of the user's demand response behavior by purpose of use of the user (by purpose of use of the building). In FIG. 10, DR participation is induced by presenting the user with an incentive (point) when the DR participation time is determined and when the DR participation or the participation time is not determined.

Figure 11:
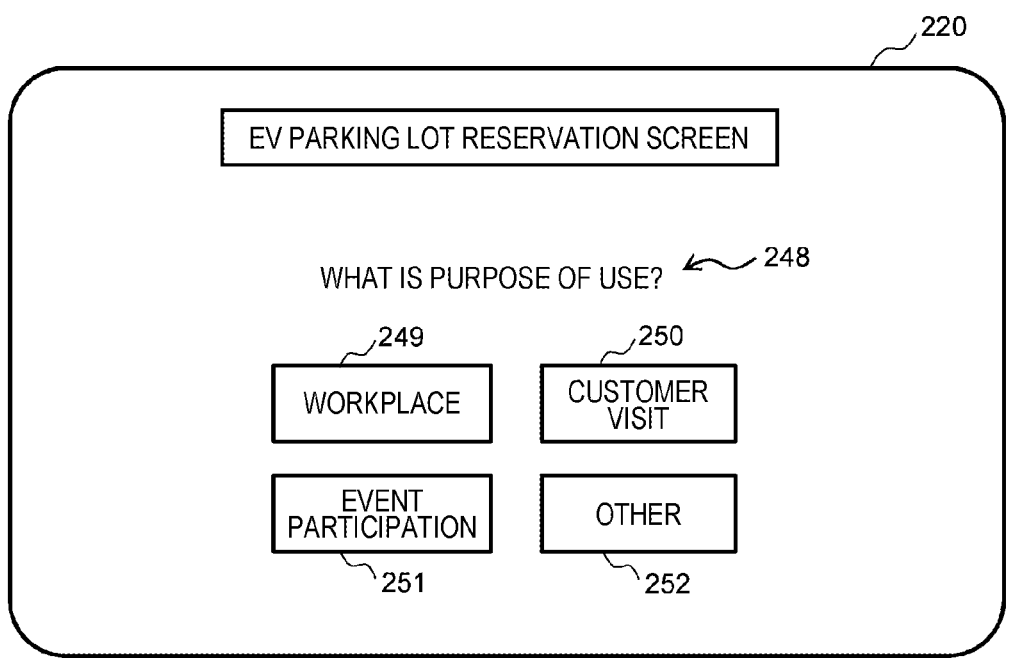
FIG. 11 is a configuration diagram showing an example of an EV parking lot reservation screen in an office building according to the embodiment of the present invention.

FIG. 11 shows an example of an EV parking lot reservation screen for an office building. On the EV parking lot reservation screen 220, "What is the purpose of use?" is displayed as the display information 248 generated based on the information transmitted from the energy management apparatus 100, and below that, as the selection buttons for asking the purpose of use of the office building, a selection button 249 indicating "workplace", a selection button 250 indicating "customer visit", a selection button 251 indicating "event participation", and a selection button 252 indicating "other" are displayed. When the user operates any one of the selection buttons, the operation content of the selection button is transmitted from the user terminal 200 to the energy management apparatus 100 as a question answer.

This screen asks a question of the purpose of use of the office building. It is expected that users who commute to the workplace will have a higher implementation probability of DR participation and will have longer DR participation time than for other purposes.

Figure 12:
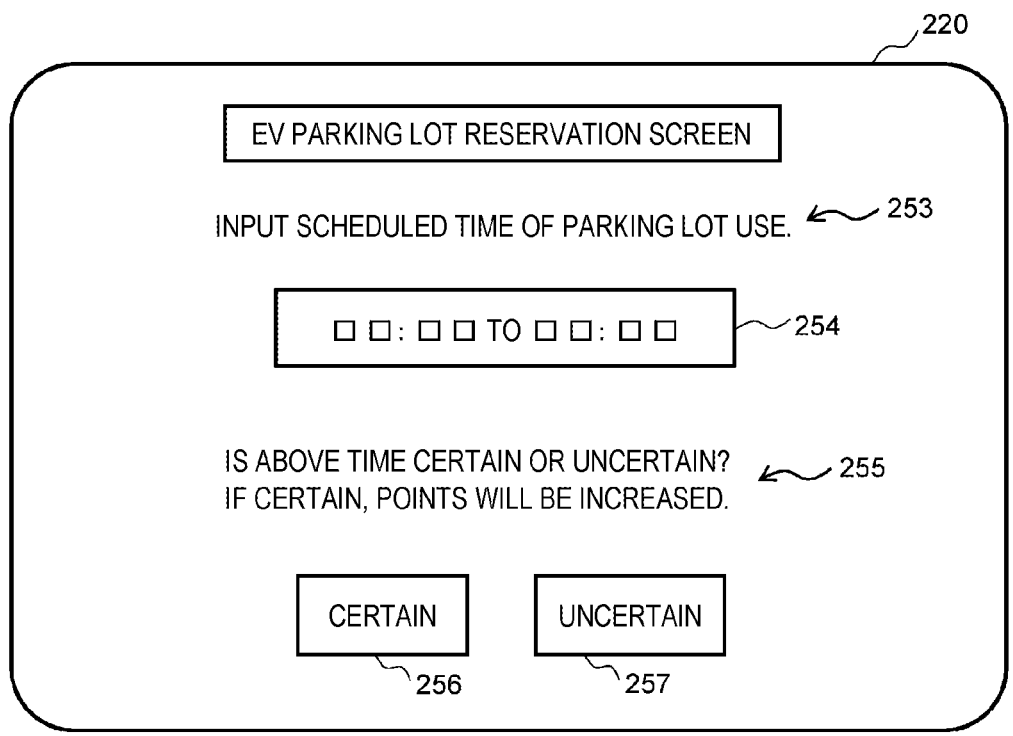
FIG. 12 is a configuration diagram showing an example of an EV parking lot reservation screen in an office building according to the embodiment of the present invention.

FIG. 12 shows an example of an EV parking lot reservation screen when the user inputs a schedule of parking time for an office building. On the EV parking lot reservation screen 220, "Input scheduled time of the parking lot use." is displayed as the display information 253 generated based on the information transmitted from the energy management apparatus 100, and an input region 254 for inputting the scheduled time is displayed below that. In addition, below the input region 254, as display information 255, "Is the above time certain or uncertain? In the case of certainty, the points will be increased." is displayed, and as selection buttons, a selection button 256 indicating "certain" and a selection button 257 indicating "uncertain" are displayed. Here, in order to evaluate the DR implementation rate, the certainty of the above time is asked. The display information 255 indicates that the points are increased if the scheduled time is certain. When the user operates the selection button 256 or the selection button 257, the information on the input region 254 and the operation content of the selection button are transmitted from the user terminal 200 to the energy management apparatus 100 as pre-registration information or a question answer.

Figure 13:
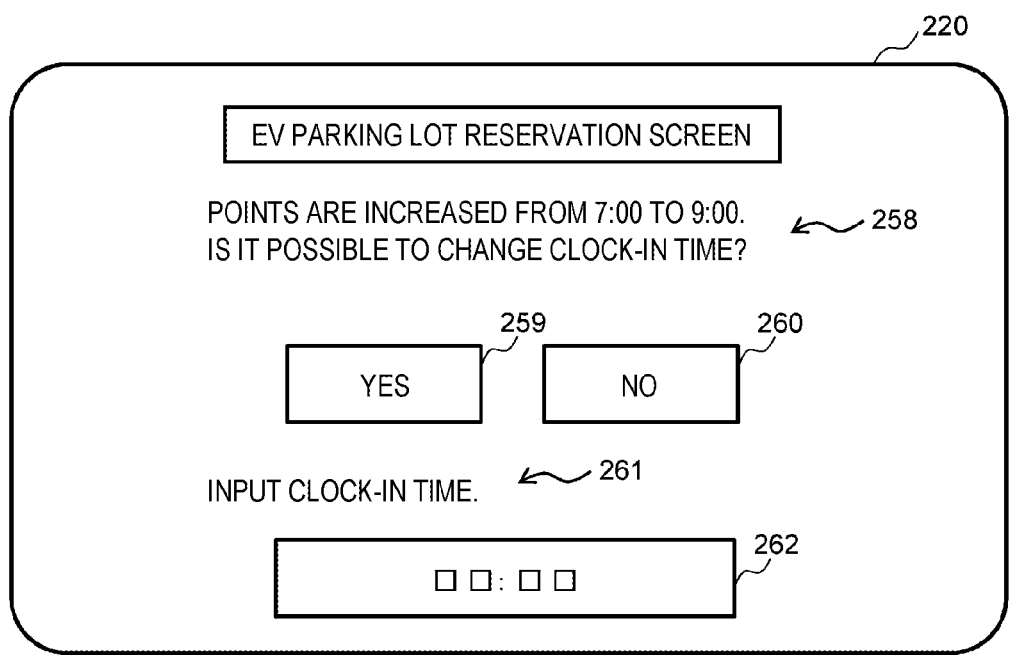
FIG. 13 is a configuration diagram showing an example of an EV parking lot reservation screen in an office building according to the embodiment of the present invention.

FIG. 13 shows an example of an EV parking lot reservation screen for urging a user to participate in DR at a specific time period, targeting an office building. On the EV parking lot reservation screen 220, as the display information 258 generated based on the information transmitted from the energy management apparatus 100, "Points are increased from 7:00 to 9:00. Is it possible to change clock-in time?" is displayed, and below that, as selection buttons, a selection button 259 indicating "Yes" and a selection button 260 indicating "No" are displayed. Below the selection buttons 259 and 260, "Input clock-in time." is displayed as the display information 261, and below that, an input region 262 for inputting a clock-in time is displayed.

In order to increase the number of DR participants during the time period (7:00 to 9:00) when the needs of DR increase, the user is asked a question that urges the user to clock in at a time earlier than usual by increasing the points. In addition, when the user accepts to participate in DR, the user is asked to input a changeable time in the clock-in time input region 262. When the user operates any one of the selection buttons, the operation content of the selection button is transmitted from the user terminal 200 to the energy management apparatus 100 as a question answer. On this occasion, when the user operates the selection button 259 and inputs the clock-in time in the input region 262, the information on the clock-in time is also transmitted as the information on the question answer.

Figure 14:
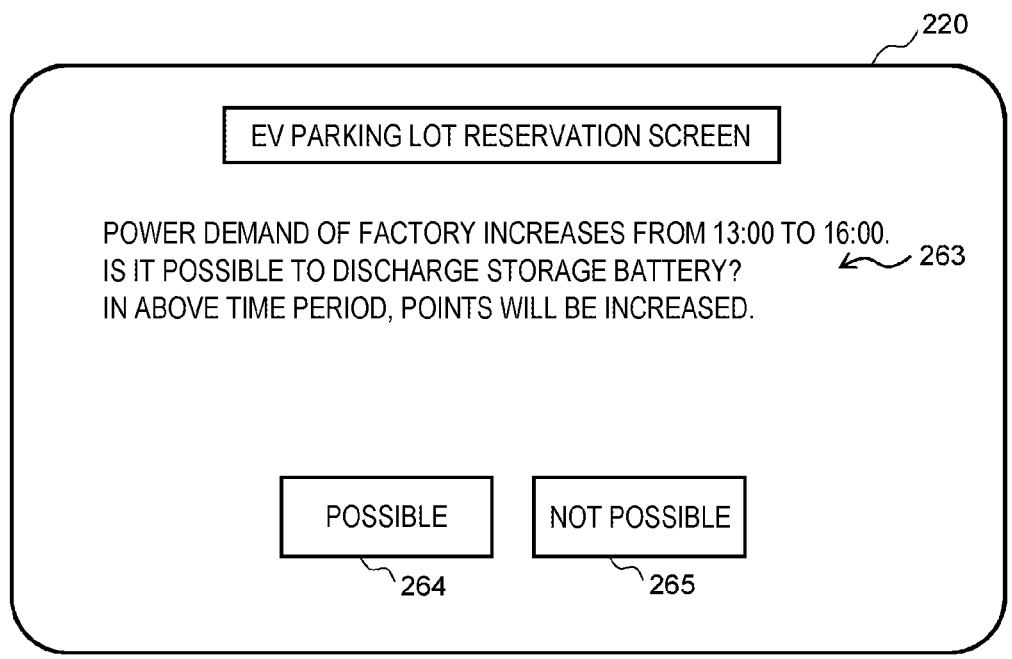
FIG. 14 is a configuration diagram showing an example of an EV parking lot reservation screen in a manufacturing plant according to the embodiment of the present invention.

FIG. 14 shows an example of an EV parking lot reservation screen for urging a user to participate in DR at a specific time period, targeting a manufacturing plant. On the EV parking lot reservation screen 220, as the display information 263 generated based on the information transmitted from the energy management apparatus 100, for example, "The power demand of the factory increases from 13:00 to 16:00. Is it possible to discharge the storage battery? In the above time period, the points will be increased." is displayed, and as the selection buttons, the selection button 264 indicating "possible" and the selection button 265 indicating "not possible" are displayed. In the case of a manufacturing plant, since the power demand increases during the time period (13:00 to 16:00) when the needs of DR increase, the user is asked a question that urges the user to discharge the EV storage battery by increasing the points. On this occasion, the display information 263 indicates that points are increased as an incentive when participating in DR, and urges DR participation. In addition, when the user operates any one of the selection buttons, the operation content of the selection button is transmitted from the user terminal 200 to the energy management apparatus 100 as a question answer. When the user discharges the EV storage battery, electric power 3 is supplied from the electric vehicle charging station 10 into the manufacturing plant.

According to the present embodiment, the energy consumption amount of the management target (electric vehicle (EV) charging station 10) can be predicted with high accuracy based on the information in which the user's behavior is reflected. In addition, sending a question inducing DR to the user makes it possible to improve the DR implementation rate of the user and reduce the energy cost of the consumer.

Second Embodiment

In the present embodiment, with at least one of the air conditioning facility, lighting facility, and home appliances as the management target, the energy management controller prepares a question regarding the behavior of the user who uses the management target, and transmits the prepared question to the user terminal. The configuration of the energy system 1 is the same as that of the first embodiment.

Figure 16:
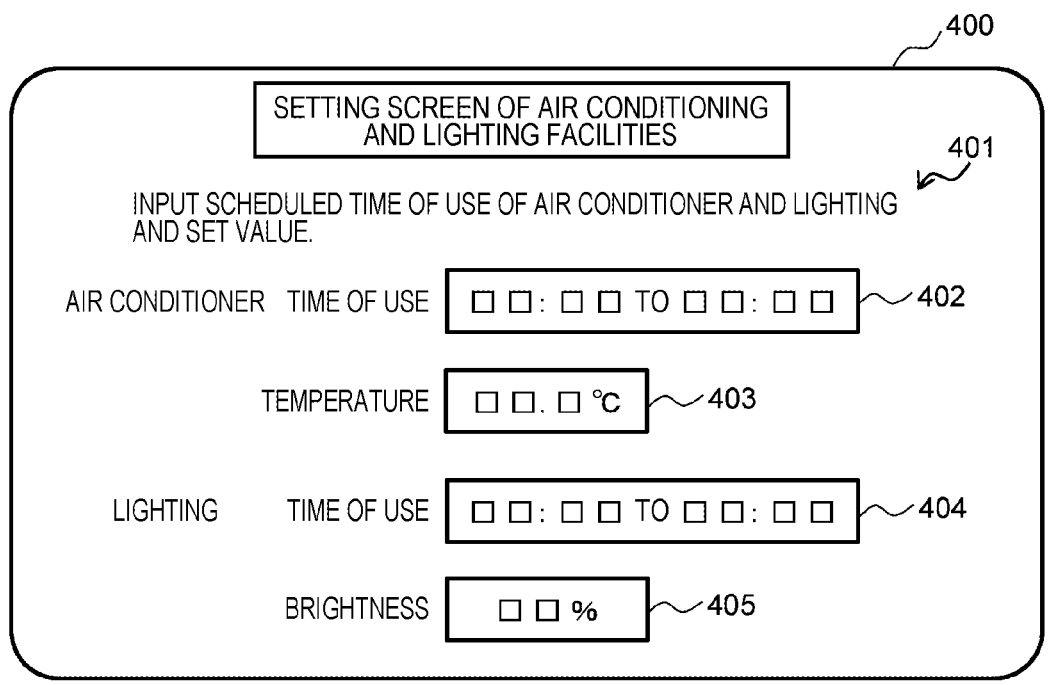
FIG. 16 is a configuration diagram showing an example of a setting screen for air conditioning and lighting facilities for an office building according to the embodiment of the present invention.

FIG. 16 shows an example of a setting screen for air conditioning and lighting facilities for an office building. The setting screen of the air-conditioning and lighting facilities 400 is, for example, a screen of the user-dedicated terminal of the energy management apparatus 100 in the living room or a screen of the personal computer, and is a screen for setting the operating condition of the air-conditioning and lighting facilities in normal times. On the setting screen of the air-conditioning and lighting facilities 400, as the display information 401 generated by the energy management apparatus 100, "Input the scheduled time of use of the air conditioner and lighting and the set value." is displayed, and below that, an input region 402 for inputting the time of use of the air conditioning facility, an input region 403 for inputting the temperature of the air conditioning facility, an input region 404 for inputting the time of use of the lighting facility, and an input region 405 for inputting the brightness of the lighting facility are displayed. When the time of use and the set value are input to each input region, these pieces of information are stored in the energy management apparatus 100. It should be noted that the temperature of the air conditioning facility is a value with respect to the room temperature, and the brightness of the lighting facility is a ratio with respect to the rated output of the lighting facility.

Figure 17:
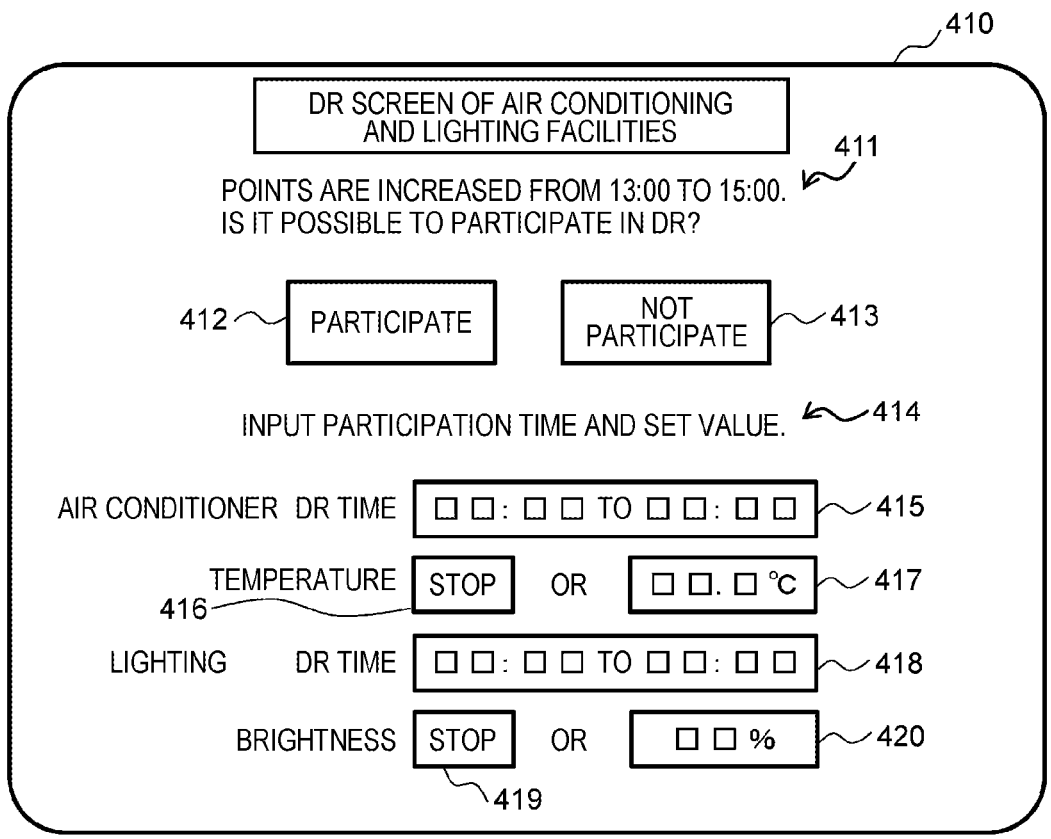
FIG. 17 is a configuration diagram showing an example of a setting screen regarding DR of air conditioning and lighting facilities for an office building according to the embodiment of the present invention.

FIG. 17 shows an example of a setting screen regarding DR of the air conditioning and lighting facilities for an office building. On the DR screen (setting screen) of the air conditioning and lighting facilities 410, as the display information 411 generated based on the information transmitted from the energy management apparatus 100, "Points are increased from 13:00 to 15:00. Is it possible to participate in DR?" is displayed, and below that, as selection buttons, a selection button 412 indicating "participate" and a selection button 413 indicating "not participate" are displayed. Below the selection buttons, as the display information 414, "Input the participation time and the set value." is displayed. Furthermore, below the display information 414, an input region 415 for inputting the DR time (DR time period) of the air conditioning facility, a selection button 416 for stopping the air conditioning facility, an input region 417 for inputting the temperature of the air conditioning facility, an input region 418 for inputting the DR time (DR time period) of the lighting facility, a selection button 419 for stopping the lighting facility, and an input region 420 for inputting the brightness of the lighting facility are displayed.

When participating in DR, the user selects the selection button 412, inputs the participation time period in DR in the input regions 415 and 418, selects the selection buttons 416 and 419, or inputs the set values in the input regions 417 and 420. These pieces of information are transmitted to the energy management apparatus 100 as pre-registration information. The temperature is a value with respect to the room temperature, and the brightness is a ratio with respect to the rated output of the lighting facility.

Figure 18:
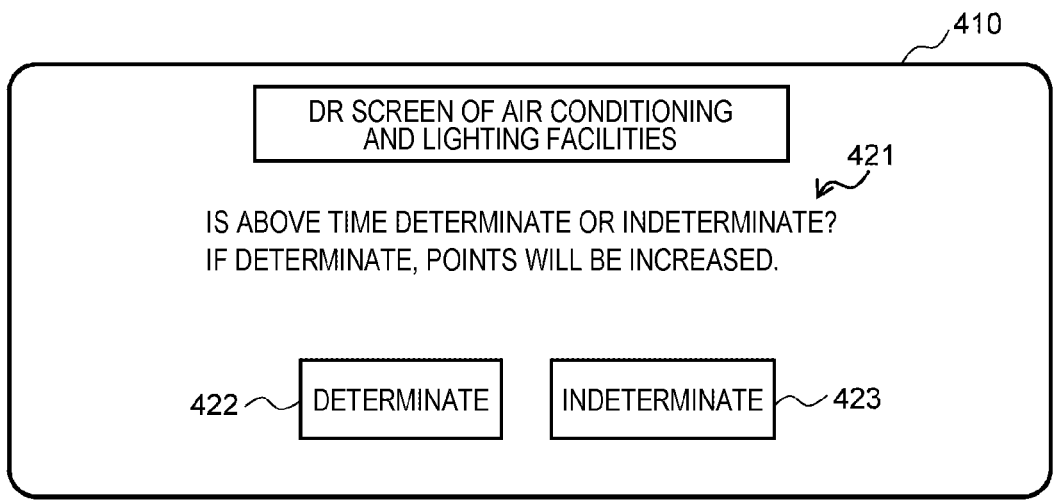
FIG. 18 is a configuration diagram showing another example of a setting screen regarding DR of air conditioning and lighting facilities for an office building according to the embodiment of the present invention.

FIG. 18 shows another example of the setting screen regarding DR of the air conditioning and lighting facilities for an office building. On the DR screen (setting screen) 410 of the air conditioning and lighting facilities, as the display information generated based on the information transmitted from the energy management apparatus 100 and the display information 421 for asking the user whether the set DR participation time is determinate or indeterminate, "Is the above time determinate or indeterminate? In the case of determinateness, the points will be increased." is displayed. Below the display information 421, as selection buttons, a selection button 422 indicating "determinate" and a selection button 423 indicating "indeterminate" are displayed.

When the selection button 422 or 423 is selected, the information on the selected selection button is transmitted to the energy management apparatus 100 as a question answer or pre-registration information. On this occasion, based on the information that the DR participation time of the user is determinate or indeterminate, and the registration information (pre-registration information) and the conventional result (information), the energy management apparatus 100 can evaluate the DR implementation probability of the user, plan the DR plan, and evaluate the DR incentive.

Figure 19:
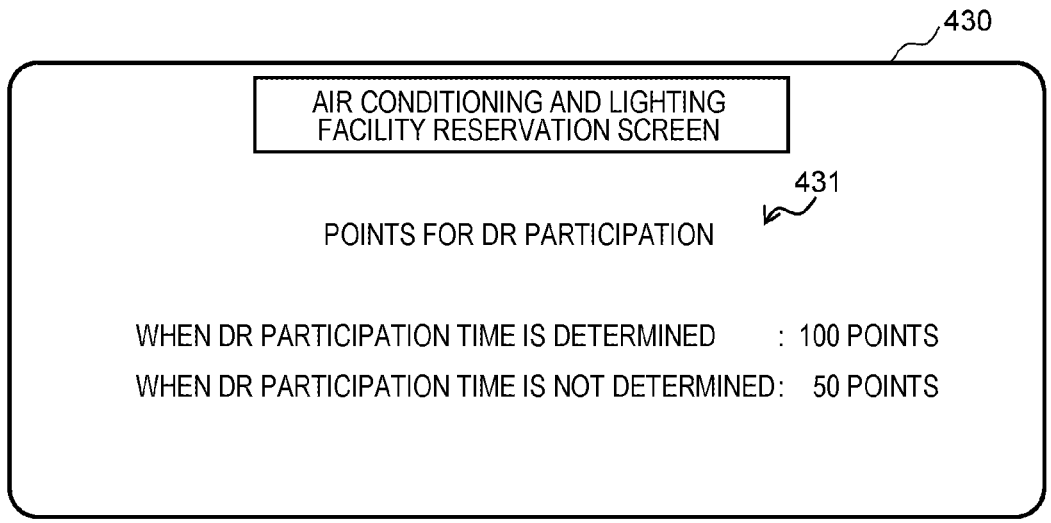
FIG. 19 is a configuration diagram showing an example of a reservation screen for air conditioning and lighting facilities for an office building according to the embodiment of the present invention.

FIG. 19 shows an example of a reservation screen for air conditioning and lighting facilities for an office building. On the air conditioning and lighting facility reservation screen 430, as the information generated based on the information transmitted from the energy management apparatus 100, and as the display information 431 to the effect of, for example, notifying points as an incentive when determining the DR participation time and when not determining the DR participation time, "points for DR participation", "when DR participation time is determined: 100 points", and "when DR participation time is not determined: 50 points" are displayed. The user can reconsider the determinateness/indeterminateness of the DR participation time based on the notified points.

Figure 20:
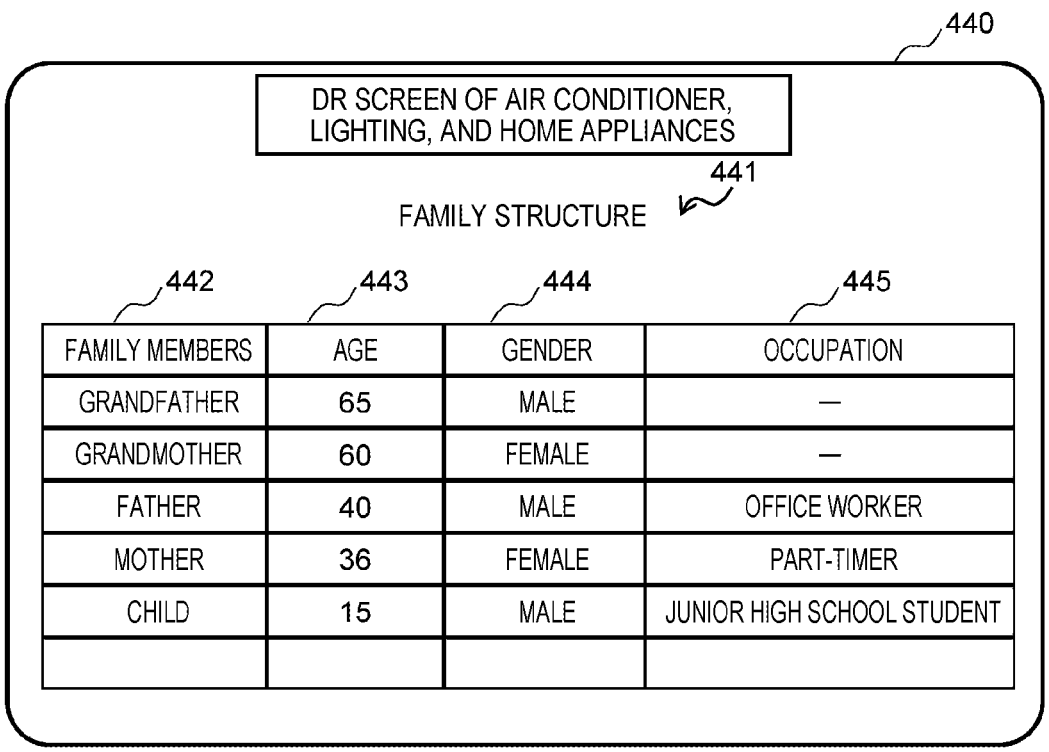
FIG. 20 is a configuration diagram showing an example of a setting screen regarding DR of the air conditioning facility, lighting facility, and home appliances of a target home in a condominium according to the embodiment of the present invention.

FIG. 20 shows an example of the setting screen regarding the DR of an air conditioning facility, a lighting facility, and home appliances of a target home in a condominium. The DR screen (setting screen) 440 of this air conditioner, lighting, and home appliances is, for example, a screen of the user-dedicated terminal of the energy management apparatus 100 in the living room or a screen of the personal computer. On the DR screen 440 of the air conditioner, lighting, and home appliances, as the display information generated based on the information transmitted from the energy management apparatus 100, and as the display information 441 that urges the input of the personnel composition of the occupants of the condominium, "family structure" is displayed, and below the display information 441, the family 442 being an input region for inputting information on family members, the age 443 being an input region for inputting the age of the family, the gender 444 being an input region for inputting the gender of the family, and the occupation 445 being an input region for inputting the occupation of the family are displayed. The information input in each input region is transmitted to the energy management apparatus 100 as a question answer or pre-registration information. In addition, the information input to each input region is information by question item specified by the information on the question answer, and is used when the behavior of the demand response of the user is cluster-analyzed similarly to the information indicating the purpose of use of the user.

Figure 21:
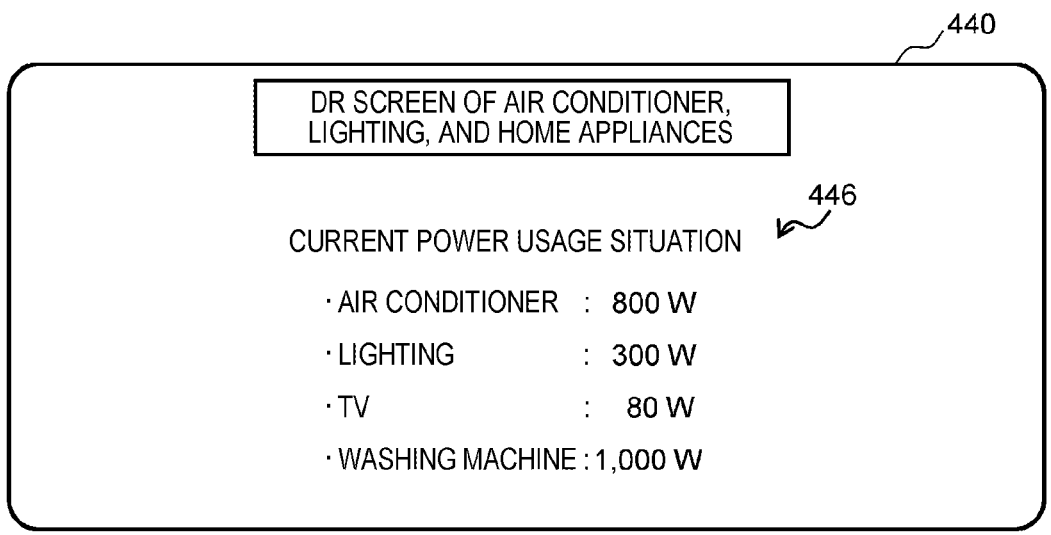
FIG. 21 is a configuration diagram showing an example of a DR screen regarding the current operation conditions of the air conditioner, lighting, and various home appliances of a target home in a condominium according to the embodiment of the present invention.

FIG. 21 shows an example of the DR screen regarding the current operating conditions of the air conditioner, lighting, and various home appliances of the target home in the condominium. On the DR screen 440 of the air conditioner, lighting, and home appliances, as the display information generated based on the information detected by various sensors arranged in the target home, and as the display information 446 regarding the current operating conditions of the air conditioner, lighting, and various home appliances of the target home in the condominium, "current power usage situation", "air conditioner: 800 W", "lighting: 300 W", "TV: 80 W", and "washing machine: 1,000 W" are displayed.

Figure 22:
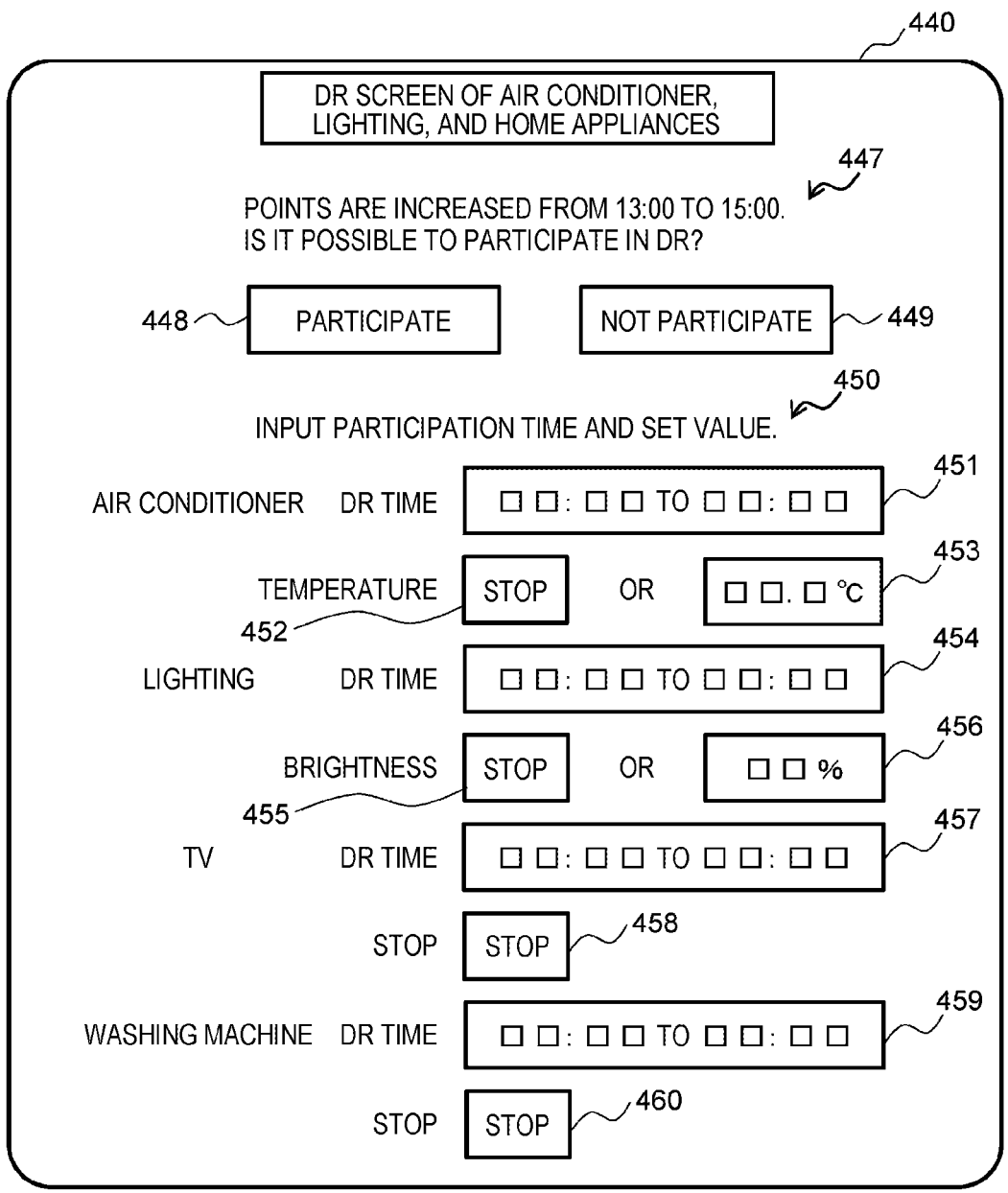
FIG. 22 is a configuration diagram showing an example of a setting screen regarding DR of the air conditioner, lighting, and home appliances of a target home in a condominium according to the embodiment of the present invention.

FIG. 22 shows an example of a setting screen regarding DR of the air conditioner, lighting, and home appliances of a target home in a condominium. On the DR screen (setting screen) of the air conditioner, lighting, and home appliances 440, as the display information 447 generated based on the information transmitted from the energy management apparatus 100, "Points are increased from 13:00 to 15:00. Is it possible to participate in DR?" is displayed, and below that, as selection buttons, a selection button 448 indicating "participate" and a selection button 449 indicating "not participate" are displayed. Below the selection buttons, as the display information 450, "Input the participation time and the set value." is displayed. Furthermore, below the display information 450, an input region 451 for inputting the DR time (DR time period) of the air conditioning facility, a selection button 452 for stopping the air conditioning facility, an input region 453 for inputting the temperature of the air conditioning facility, an input region 454 for inputting the DR time (DR time period) of the lighting facility, a selection button 455 for stopping the lighting facility, an input region 456 for inputting the brightness of the lighting facility, an input region 457 for inputting the DR time (DR time period) of the TV, a selection button 458 for stopping the TV, an Input region 459 for inputting the DR time (DR time period) of the washing machine, and a selection button 460 for stopping the washing machine are displayed.

When participating in DR, the user selects the selection button 448, inputs the participation time period in DR in the input regions 451, 454, 457, and 459, and selects the selection buttons 452, 455, 458, and 460, or inputs the set values in the input regions 453 and 456. These pieces of information are transmitted to the energy management apparatus 100 as pre-registration information. The temperature of the air conditioning facility is a value with respect to the room temperature, and the brightness of the lighting facility is a ratio with respect to the rated output of the lighting facility.

Figure 23:
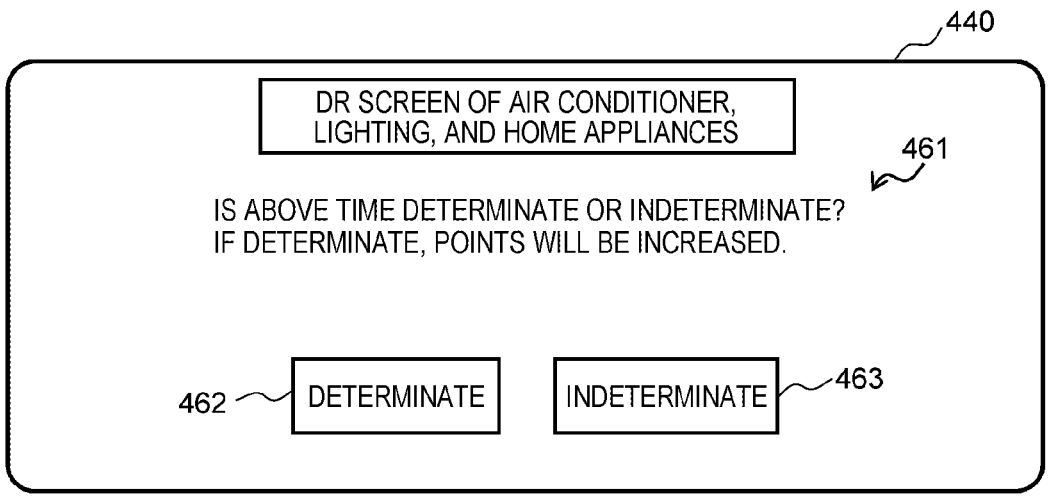
FIG. 23 is a configuration diagram showing another example of a setting screen regarding DR of the air conditioner, lighting, and home appliances of a target home in a condominium according to the embodiment of the present invention.

FIG. 23 shows another example of a setting screen regarding DR of the air conditioner, lighting, and home appliances of a target home in a condominium. On the DR screen (setting screen) 440 of the air conditioner, lighting, and home appliances, as the display information generated based on the information transmitted from the energy management apparatus 100 and the display information 461 for asking the user whether the set DR participation time is determinate or indeterminate, "Is the above time determinate or indeterminate? In the case of determinateness, the points will be increased." is displayed. Below the display information 461, as selection buttons, a selection button 462 indicating "determinate" and a selection button 463 indicating "indeterminate" are displayed. When the selection button 462 or 463 is selected, the information on the selected selection button is transmitted to the energy management apparatus 100 as a question answer or pre-registration information.

On this occasion, based on the information that the DR participation time of the user is determinate or indeterminate, the registration information (pre-registration information) of the personnel composition and facilities to be used, and the conventional result (information), the energy management apparatus 100 can evaluate the DR implementation probability of the user, plan the DR plan, and evaluate the DR incentive.

Figure 24:
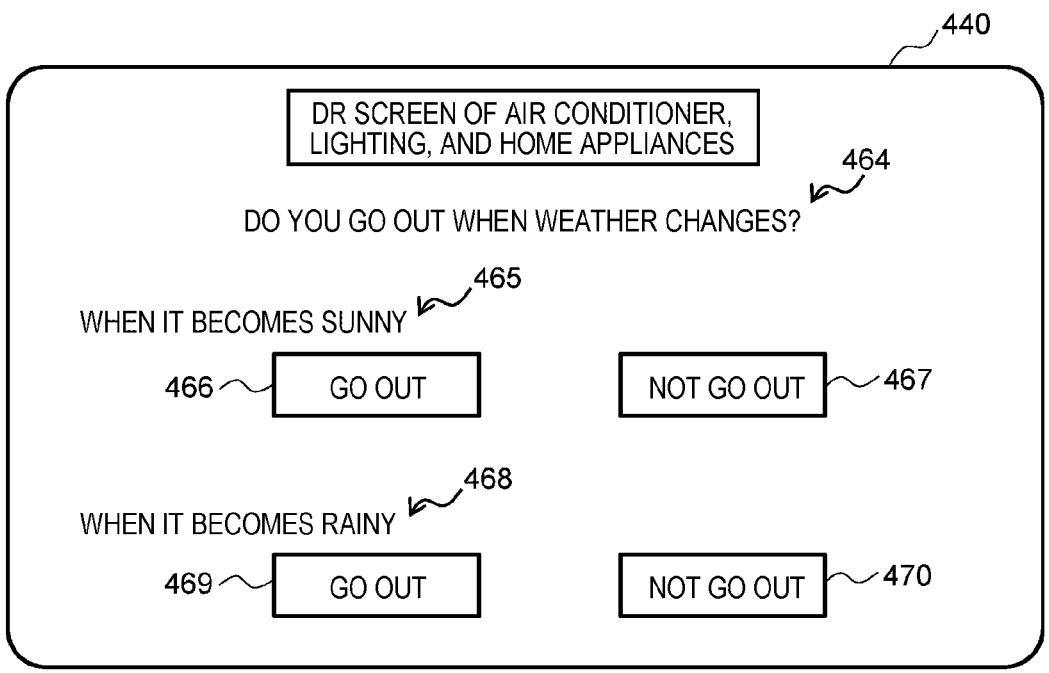
FIG. 24 is a configuration diagram showing another example of a setting screen regarding DR of the air conditioner, lighting, and home appliances of a target home in a condominium according to the embodiment of the present invention.

FIG. 24 shows another example of a setting screen regarding DR of the air conditioner, lighting, and home appliances of a target home in a condominium. On the DR screen (setting screen) 440 of the air conditioner, lighting, and home appliances, as the display information generated based on the information transmitted from the energy management apparatus 100, and as the display information 464 for further asking the user a question when the DR participation time of the user is indeterminate, "Do you go out when the weather changes?" is displayed, and below the display information 464, as the display information 465 for asking whether to go out when the weather changes in the future, "when it becomes sunny" is displayed, and similarly as the display information 468, "when it becomes rainy" is displayed. Below the display information 465, as selection buttons, a selection button 466 indicating "go out" and a selection button 467 indicating "not go out" are displayed, and below the display information 468, as selection buttons, a selection button 469 indicating "go out" and a selection button 470 indicating "not go out" are displayed.

When the selection button 466 or 467, alternatively the selection button 469 or 470 is selected, the information on the selected selection button is transmitted to the energy management apparatus 100 as a question answer or pre-registration information. On this occasion, the energy management apparatus 100 can ask whether to go out when the weather changes in the future, and use the information on the question answer as a reference for the evaluation of the DR implementation probability of the user.

Figure 25:
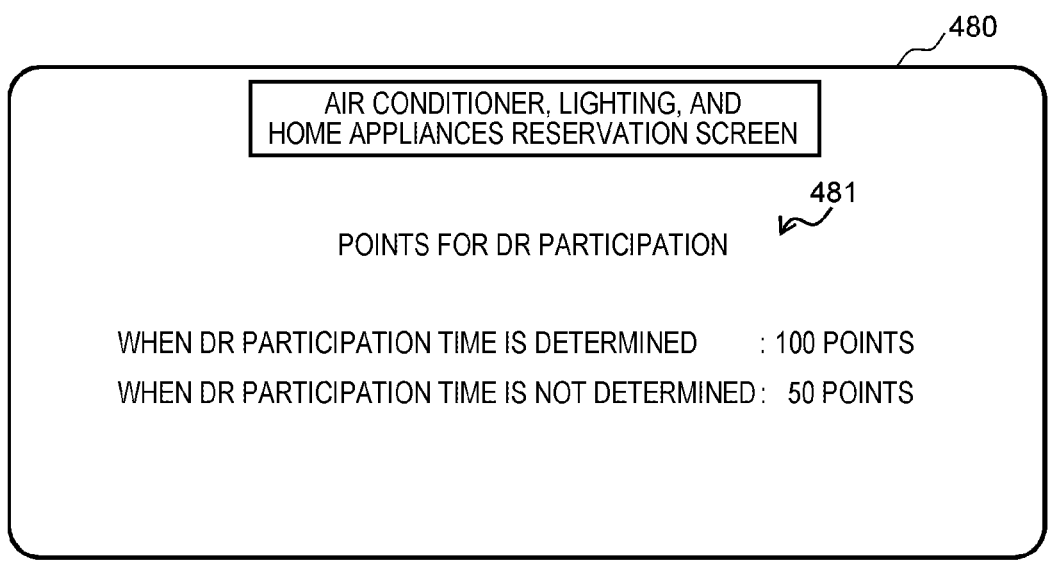
FIG. 25 is a configuration diagram showing an example of a reservation screen of the air conditioner, lighting, and home appliances of a target home in a condominium according to the embodiment of the present invention.

FIG. 25 shows an example of a reservation screen for the air conditioner, lighting, and home appliances of a target home in a condominium. On the air conditioner, lighting, and home appliances reservation screen 480, as the information generated based on the information transmitted from the energy management apparatus 100, and as the display information 481 to the effect of, for example, notifying points as an incentive when determining the DR participation time and when not determining the DR participation time, "points for DR participation", "when DR participation time is determined: 100 points", and "when DR participation time is not determined: 50 points" are displayed. The user can reconsider the determinateness/indeterminateness of the DR participation time based on the notified points.

According to the present embodiment, the energy consumption amount of the management target (air conditioning facility, lighting facility, and home appliances) can be predicted with high accuracy based on the information in which the user's behavior is reflected. In addition, sending a question inducing DR to the user makes it possible to improve the DR implementation rate of the user and reduce the energy cost of the consumer.

It should be noted that the present invention is not limited to the embodiments described above, and includes various modifications. For example, the CPU in the energy management apparatus 100 can be configured as a controller that manages one or more management targets that consume energy. On this occasion, the controller includes a question preparation unit that prepares a question regarding the behavior of the user who uses the management target and transmits the prepared question to the user terminal 200 via the network, and a prediction calculation unit that predicts the energy consumption amount of the management target based on the received question answer when a question answer transmitted from the user terminal 200 is received. In this case, the DR behavior inducing question preparation unit 102 functions as a question preparation unit, and the DR implementation probability evaluation unit 103, the DR operation planning unit 104, and the DR incentive evaluation unit 105 function as a prediction calculation unit. The above-described embodiments are described in detail for easy understanding of the present invention, and are not necessarily limited to those including all the configurations described. In addition, it is possible to add, delete, and replace another configuration with respect to a part of the configurations of the embodiments.

In addition, each of the above-described configurations, functions, and the like may be partially or entirely achieved by hardware by, for example, designing with integrated circuits. In addition, each of the above-described configurations, functions, and the like may be achieved by software by interpreting and executing a program that achieves each function by the processor. Information on programs, tables, files, and the like that achieve each function can be recorded in a recording device such as a memory, a hard disk, or a solid state drive (SSD), or can be recorded in a recording medium such as an integrated circuit (IC) card, a secure digital (SD) memory card, or a digital versatile disc (DVD).

REFERENCE SIGNS LIST

1 energy system
2 electric power system
3 electric power
4 gas system
5 gas
6 generator
7 storage battery
8 turbo refrigerator
9 air conditioning facility
10 electric vehicle charging station
11 electric vehicle
12 air conditioning facility
13 another load
100 energy management apparatus
101 conventional result DB
102 DR behavior inducing question preparation unit
103 DR implementation probability evaluation unit
104 DR operation planning unit
105 DR incentive evaluation unit
200 user terminal

The invention claimed is:

1. An energy operation support system comprising:
an energy management apparatus configured to manage at least one or more management target configured to consume energy; and
a user terminal configured to transmit and receive information to and from the energy management apparatus via a network, wherein
the energy management apparatus includes an energy management controller configured to prepare a question regarding a behavior of a user who uses the at least one or more management target, the energy management controller co nfigured to transmit the question prepared to the user terminal,
the user terminal includes a user terminal controller configured to transmit a question answer regarding the question received to the energy management controller when receiving the question transmitted from the energy management controller,
the energy management controller predicts an energy consumption amount of the at least one or more management target based on the question answer received when receiving the question answer transmitted from the user terminal controller,
when receiving a request-to-send of information regarding a demand response from the energy management controller, the user terminal controller transmits pre-registration information according to the request-to-send to the energy management controller,
when receiving the pre-registration information from the user terminal controller, the energy management controller prepares a question that induces a behavior of a demand response of the user based on the pre-registration information received and conventional result information regarding the demand response, and transmits the question prepared to the user terminal,
when further receiving the question transmitted from the energy management controller, the user terminal controller transmits the question answer regarding the question received to the energy management controller,
when further receiving the question answer transmitted from the user terminal controller, the energy management controller predicts demand response implementation probability of the user and a demand response amount of the at least one management target based on the question answer received, and
when receiving the question answer, based on the pre-registration information, the conventional result information, and the question answer, the energy management controller performs cluster analysis on a behavior of a demand response of the user by question item specified by information on the question answer and predicts demand response implementation probability of the user from a result of the cluster analysis.

2. The energy operation support system according to claim 1, wherein when preparing a question that induces a behavior of a demand response of the user, the energy management controller changes content of the question according to a business category of a consumer who manages the at least one management target.

3. The energy operation support system according to claim 1, wherein when predicting a demand response amount of the at least one management target, the energy management controller plans an operation plan for operating electric power of the entire at least one management target based on a demand response amount of the at least one management target predicted.

4. The energy operation support system according to claim 3, wherein when preparing the operation plan, the energy management controller evaluates an incentive for the user based on the operation plan planned, and notifies the user terminal controller of information regarding the evaluated incentive as prior information before the user uses the at least one management target.

5. An energy operation support method in a system including:
   an energy management apparatus configured to manage at least one or more management target configured to consume energy, and
   a user terminal configured to transmit and receive information to and from the energy management apparatus via a network,
   the energy operation support method comprising:
      a first step in which the energy management apparatus prepares a question regarding a behavior of a user who uses the at least one or more management target, and transmits the question prepared to the user terminal,
      a second step in which the user terminal transmits a question answer regarding the question received to the energy management apparatus when receiving the question transmitted from the energy management apparatus in the first step, and
      a third step in which the energy management apparatus predicts an energy consumption amount of the at least one or more management target based on the question answer received when receiving the question answer transmitted from the user terminal in the second step, wherein
         when further receiving the question transmitted from the energy management apparatus, the user terminal transmits the question answer regarding the question received to the energy management apparatus,
         when further receiving the question answer transmitted from the user terminal, the energy management apparatus predicts demand response implementation probability of the user and a demand response amount of the at least one management target based on the question answer received, and
         when receiving the question answer transmitted from the user terminal, based on pre-registration information, conventional result information, and the question answer, the energy management apparatus performs cluster analysis on a behavior of a demand response of the user by question item specified by information on the question answer and predicts demand response implementation probability of the user from a result of the cluster analysis.

6. An energy management apparatus comprising a controller configured to manage at least one or more management target configured to consume energy, wherein the controller includes:
   a question preparation unit configured to prepare a question regarding a behavior of a user who uses the at least one or more management target, the question preparation unit configured to transmit the question prepared to a user terminal via a network, and
   a prediction calculation unit configured to predict, when receiving a question answer transmitted from the user terminal, an energy consumption amount of the at least one or more management target based on the question answer received, wherein
      when receiving pre-registration information from the user terminal, the question preparation unit prepares a question that induces a behavior of a demand response of the user based on the pre-registration information received and conventional result information regarding a demand response, and transmits the question prepared to the user terminal,
      when receiving the question answer transmitted from the user terminal, the prediction calculation unit predicts demand response implementation probability of the user and a demand response amount of the at least one management target based on the question answer received, and
      when receiving the question answer transmitted from the user terminal, based on the pre-registration information, the conventional result information, and the question answer, the prediction calculation unit performs cluster analysis on a behavior of a demand response of the user by question item specified by information on the question answer and predicts demand response implementation probability of the user from a result of the cluster analysis.

7. The energy management apparatus according to claim 6, wherein when preparing a question that induces a behavior of a demand response of the user, the question preparation unit changes content of the question according to a business category of a consumer who manages the at least one management target.

8. The energy management apparatus according to claim 6, wherein when predicting a demand response amount of the at least one management target, the prediction calculation unit plans an operation plan for operating electric power of the entire at least one management target based on a demand response amount of the at least one management target predicted.

9. The energy management apparatus according to claim 8, wherein
   when preparing the operation plan, the prediction calculation unit evaluates an incentive for the user based on the operation plan planned, and notifies the user terminal of information regarding the evaluated incentive as prior information before the user uses the at least one management target.

* * * * *